(12) United States Patent
Strand et al.

(10) Patent No.: US 11,879,538 B2
(45) Date of Patent: Jan. 23, 2024

(54) PLANETARY GEARSET AND A VEHICLE OR STATIONARY UNIT COMPRISING SUCH GEARSET

(71) Applicant: Volvo Construction Equipment AB, Eskilstuna (SE)

(72) Inventors: Henrik Strand, Eskilstuna (SE); Johan Sahlberg, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 396 days.

(21) Appl. No.: 17/275,394

(22) PCT Filed: Sep. 13, 2018

(86) PCT No.: PCT/EP2018/074786
§ 371 (c)(1),
(2) Date: Mar. 11, 2021

(87) PCT Pub. No.: WO2020/052768
PCT Pub. Date: Mar. 19, 2020

(65) Prior Publication Data
US 2022/0056994 A1    Feb. 24, 2022

(51) Int. Cl.
*F16H 57/04* (2010.01)

(52) U.S. Cl.
CPC ....... *F16H 57/0426* (2013.01); *F16H 57/043* (2013.01); *F16H 57/0479* (2013.01); *F16H 57/0482* (2013.01)

(58) Field of Classification Search
CPC .............. F16H 57/0426; F16H 57/043; F16H 57/0423; F16H 57/0479; F16H 57/0482
See application file for complete search history.

(56) References Cited

U.S. PATENT DOCUMENTS

| | | |
|---|---|---|
| 2006/0068961 A1 | 3/2006 | Haka |
| 2006/0148611 A1 | 7/2006 | Neudecker et al. |
| (Continued) | | |

FOREIGN PATENT DOCUMENTS

| | | |
|---|---|---|
| CN | 102840317 A | 12/2012 |
| CN | 107631014 A | 1/2018 |
| (Continued) | | |

OTHER PUBLICATIONS

International Search Report and Written Opinion of the International Searching Authority, PCT/EP2018/074786, dated Oct. 26, 2018, 13 pages.

(Continued)

*Primary Examiner* — Lori Wu
(74) *Attorney, Agent, or Firm* — Sage Patent Group

(57) ABSTRACT

A planetary gearset including a gear arrangement including a centrally arranged sun gear rotationally fixable to a drive shaft, a set of planet gears distributed circumferentially around the sun gear, a ring gear member extending circumferentially around the planet gears, a ring gear, planet gear shafts arranged centrally in a corresponding planet gear, planet gear bearings arranged between a corresponding planet gear shaft and planet gear, wherein each planet gear shaft includes a planet gear shaft channel with an inlet opening and an outlet opening, a planet carrier connected to the set of planet gears via the planet gear shafts, wherein each planet gear shaft extends in an axial direction from the planet gear through the planet carrier and includes a protruding portion that protrudes out from the planet carrier and includes the inlet opening.

15 Claims, 5 Drawing Sheets

(56) References Cited

U.S. PATENT DOCUMENTS

| | | | | |
|---|---|---|---|---|
| 2013/0225353 A1* | 8/2013 | Gallet | ................... | F01D 25/18 |
| | | | | 475/159 |
| 2016/0010563 A1* | 1/2016 | Sheridan | ................... | F02C 7/06 |
| | | | | 475/159 |
| 2017/0152937 A1* | 6/2017 | Schlack | .............. | F16H 57/0486 |
| 2018/0216722 A1* | 8/2018 | Yoshitomi | ................ | F16J 15/18 |
| 2019/0048802 A1* | 2/2019 | Desjardins | ................ | F02C 7/06 |

FOREIGN PATENT DOCUMENTS

| | | |
|---|---|---|
| DE | 112016002095 T5 | 2/2018 |
| DE | 102016220487 A1 | 4/2018 |
| EP | 2921672 A1 | 9/2015 |

OTHER PUBLICATIONS

First Office Action for Chinese Patent Application No. 201880097431.0, dated Aug. 28, 2023, 13 pages.
Search Report for Chinese Patent Application No. 201880097431.0, dated Aug. 28, 2023, 5 pages.

\* cited by examiner

PLANETARY GEARSET AND A VEHICLE OR STATIONARY UNIT COMPRISING SUCH GEARSET

CROSS REFERENCE TO RELATED APPLICATIONS

This application is a 35 U.S.C. § 371 national stage application of PCT International Application No. PCT/EP2018/074786 filed on Sep. 13, 2018, the disclosure and content of which is incorporated by reference herein in its entirety.

TECHNICAL FIELD

The invention relates to a planetary gearset and a vehicle or a stationary unit comprising a planetary gearset.

The invention can be applied in heavy-duty vehicles, such as trucks, buses and construction equipment, as well as in boats and stationary constructions such as windmills. Although the invention will be described with respect to a truck, the invention is not restricted to this particular vehicle, but may also be used in any other vehicles or arrangements where a planetary gearset is appropriate, for example articulated haulers, excavators, backhoe loaders and personal vehicles.

BACKGROUND

Planetary gearsets employed in planetary transmissions and/or drivelines provide a plurality of speed ratios between an input shaft and an output shaft. It is a well-known problem to lubricate the planet gears/planet gear bearings when a planet carrier is stationary. US 2006/0068961 addresses this problem and describes a planet gear shaft comprising channels for lubrication of the planet gear bearings, and a planet carrier connected to the set of planet gears via the planet gear shafts. The planet carrier comprises channels that connect to the planet gear shaft channels for supplying lubricants to the planet gears and planet gear bearings. One problem with such an arrangement is that the channels in the planet carrier makes the planet carrier structurally weak compared to a solid planet carrier why the planet carrier must be specially adapted.

Hence, there is a need for an improved gearset that addresses the above problems.

SUMMARY

An object of the invention is to provide an improved gearset allowing for lubrication of a planet gear bearing both when the planet carrier is stationary and rotates.

The object may be achieved by a planetary gearset comprising a gear arrangement comprising:
- a centrally arranged sun gear arranged to be rotationally fixed to a drive shaft,
- a set of planet gears distributed circumferentially around and meshing with the sun gear,
- a ring gear member extending circumferentially around the planet gears and being provided with a ring gear meshing with the planet gears,
- a set of planet gear shafts, each arranged centrally in and connected to a corresponding planet gear
- a set of planet gear bearings, each arranged between a corresponding planet gear shaft and its corresponding planet gear for rotatably connecting the planet gear to the planet gear shaft,
- wherein each planet gear shaft comprises a planet gear shaft channel with an inlet opening and an outlet opening for feeding of a lubricant to the planet gear bearing,
- a planet carrier connected to the set of planet gears via the planet gear shafts, wherein
- each planet gear shaft extends in an axial direction from the planet gear through the planet carrier and comprises a protruding portion that protrudes out from the planet carrier on an opposite side of the planet carrier in relation to the planet gear, wherein the protruding portion comprises the inlet opening that allows for connection of a lubricant feed unit being separate from the planet carrier.

One advantage of the gearset is that the planet carrier is not part of a lubricant feed system and is therefore free from channels, which makes it possible to manufacture a solid small/thin and lightweight planet carrier. A further advantage is that the lubricant feed unit can be designed independently from the planet carrier, but need only to take into account a suitable connection to the protruding portion.

The planet carrier comprises an inside surface facing the planet gears and an outside surface facing away from the planet gears. The protruding portion protrudes out from the outside surface of the planet carrier.

Further advantages and advantageous features of the invention are disclosed in the following description and in the dependent claims.

In order to facilitate the description of the invention reference is made to a cylindrical coordinate system with an axial direction and a radial direction being perpendicular to the axial direction. When referring to rotation, the rotation is about an axis extending in the axial direction. When referring to circumferential, it relates to a direction coinciding with the rotational direction.

The planetary gearset advantageously comprises a locking member arranged in connection to the planetary gear shaft and the planet carrier for locking the planet gear shaft in a predetermined position in relation to the planet carrier. The locking member can be arranged in connection to the planetary gear shaft and the planet carrier by any suitable arrangement connecting and locking the planetary gear shaft in connection to the planet carrier, for example bolts, wedges, glue, welding, etc. According to one example, the locking member comprises a locking pin and a first indentation in a planet gear shaft envelope surface and a second indentation in the planet carrier, wherein the first and second indentations are positioned in a juxtaposition in relation to each other and the locking pin is positioned partly in both the first and second indentation thereby hindering relative motion of the planetary gear shaft in relation to the planet carrier. One advantage of using pin and indentations is that the indentations can be arranged in a direction coinciding with the direction of insertion of the planetary gear shaft into the planet carrier and the locking pin can be inserted into one of the indentations and then slid into position of the second indentation. According to one example embodiment, the planet carrier comprises a through channel per planetary gear shaft extending from the inside surface to the outside surface. Each through channel is arranged to house the planetary gear shaft and is delimited by an inner wall.

According to one example embodiment, the second indentation is arranged in the inner wall and the second indentation comprises an opening in the inside surface and/or the outside surface of the planet carrier allowing for the locking pin to enter the second indentation via the opening. The second indentation is furthermore arranged with an orientation coinciding with the travel direction of the planetary gear shaft when inserted into the through channel of the planet carrier. The locking pin can be inserted into the two indentations after the planet gear shaft is positioned in the through channel, or the locking pin can be arranged in the first indentation and travels with the planetary gear shaft, when inserted into the planet carrier through channel, into the opening and second indentation thereby hindering relative rotational movement. It should be noted that alternatives are possible where the locking pin is arranged in the second indentation and inserted into the planetary gear shaft when the planetary gear shaft is inserted into the though channel.

According to yet another example embodiment, the locking pin can be fixedly arranged or be part of the planetary gear shaft and the planetary gear shaft lacks the first indentation. The locking pin then travels with the planetary gear shaft, when inserted into the planet carrier trough channel, into the opening and second indentation thereby hindering relative rotational movement. As an alternative the locking pin can be fixedly arranged to, or form part of, the inner wall in which case the second indentation is not needed. The locking pin is then inserted into the first indentation when the planetary gear shaft is inserted into the planet carrier through channel. According to this example embodiment, the first indentation comprises an opening in the planetary gear shaft allowing the locking pin to enter the first indentation when the planetary gear shaft is inserted into the planet carrier through channel thereby hindering relative rotational movement.

According to one example embodiment, the planet gear shaft channel in the planet gear shaft comprises an axially extending planet gear shaft main channel and a planet gear shaft inlet channel connecting the planet gear shaft main channel to the inlet opening, wherein the inlet opening is arranged in the planet gear shaft envelope surface facing in a radial direction. Here, radial direction is perpendicular to the axial direction. The planet gear shaft inlet channel can be arranged strictly in the radial direction, i.e. perpendicular to the axial direction or may be arranged at an angle to the axial direction. Here, envelope surface refers to the outer surface of the planet gear shaft in the radial direction.

According to one example embodiment, the planet gear shaft channel in the planet gear shaft comprises a planet gear shaft outlet channel connecting the planet gear shaft main channel to the outlet opening, wherein the outlet opening is arranged in the planet gear shaft envelope surface facing in a radial direction and in connection to the planet gear bearing. The planet gear shaft outlet channel can be arranged strictly in the radial direction, i.e. perpendicular to the axial direction or may be arranged at an angle to the axial direction.

According to one example embodiment, the planet gear shaft comprises a plurality of planet gear shaft inlet channels and corresponding inlet openings and/or a plurality of planet gear shaft outlet channels and corresponding outlet openings. One advantage is the possibility to increase the flow of lubricant. One advantage with a plurality of planet gear shaft outlet channels and corresponding outlet openings is an increased spread of lubricant towards the planet gear bearings.

According to one example embodiment, the planet gear shaft main channel is arranged concentric in the planet gear shaft. The advantage is that equally thick walls give the planet gear shaft increased strength compared to a non-symmetrically arranged channel. According to another example embodiment, the planet gear shaft main channel is arranged non-concentric in the planet gear shaft and the planet gear shaft is rotationally balanced in a different manner, for example by weight distribution.

According to one example embodiment, the planetary gearset comprises a lubricant feed unit attached to the planet carrier. The lubricant feed unit is fixedly attached to the planet carrier and follows the motion of the planet carrier, i.e. rotates or is stationary. The lubricant feed unit comprises an annular extension extending in the axial direction. Here axial direction coincides with axial direction of the planet gear shaft when mounted into the through channel of the planet carrier. The annular extension comprises feed channels, each feed channel comprising a feed channel inlet opening and a feed channel outlet opening arranged to coincide with the inlet opening of the planet gear shaft channel for fluid communication of a lubricant from the annular extension to the planet gear shaft channel. Each feed channel has a main extension in the axial direction and the feed channel outlet opening faces in the radial direction towards the inlet opening of the planet gear shaft channel. According to one example, the there is one feed channel per planetary gear shaft, but a plurality of feed channels are possible to increase fluid flow.

According to one example embodiment, the annular extension comprises a receiving portion adapted to be attached to the protruding portion of the planet gear shaft, wherein the receiving portion comprises the feed channel outlet opening coinciding with the inlet opening of the planet gear shaft. The receiving portion is formed to fit the size, form and length of the protruding portion. According to one example, the receiving portion is arranged with a play between the receiving portion and the protruding portion creating a channel that allows the lubricant to flow from the feed channel outlet opening to the inlet opening of the planet gear shaft. Sealing elements can be arranged between the planet gear shaft and the receiving portion to hinder the lubricant from leaking out towards the planet carrier. One advantage with this arrangement is that the feed channel outlet opening does not have to match, i.e. coincide, entirely with the inlet opening of the planet gear shaft to ensure fluid communication of the lubricant.

According to one example embodiment, the feed channel comprises an angled portion essentially in the radial direction and a main feed channel extending in the axial direction. The angled portion is arranged between the feed channel outlet opening and the main feed channel. The angled portion has the advantage of easy manufacture since the feed channel outlet opening can be drilled open together with the angled portion with use of a drill working at an angle in the receiving portion. Hence, the main feed channel can be created by a first drill operation from the feed channel inlet opening side and then be connected to the angled portion by a second drill operation creating the angled portion and the feed channel outlet opening from the feed channel outlet opening side. However, according to one example embodiment the feed channel comprises a straight portion in the radial direction and a main feed channel extending in the axial direction. The straight portion is arranged between the feed channel outlet opening and the main feed channel. This arrangement can also be made for example by 3D printing or casting instead of drilling.

According to one example embodiment, the planetary gearset comprises an intermediate wall comprising an annular recess having a bottom wall and two therefrom axially extending sidewalls, wherein the sidewalls form a bearing race way for the annular extension, and wherein the bottom wall is arranged at a distance from the annular extension forming an annular distribution channel between the bottom wall and the annular extension for feeding the lubricant from the intermediate wall to the feed channel inlet openings in the annular extension.

According to one example embodiment, the planetary gearset comprises an annular seal element arranged between the respective sidewalls and the annular extension, wherein the annular seal element is arranged to seal between the sidewalls and the annular extension. The annular seal element is arranged to allow for movement of the lubricant feed unit, and thus the annular extension, in relation to the intermediate wall such that the lubricant is sealed from leaking out from the annular recess between the annular extension and the axially extending sidewalls. The annular seal element may comprise one or more sealing elements.

According to one example embodiment, the intermediate wall comprises an intermediate wall channel comprising an intermediate wall inlet opening and an intermediate wall outlet opening in fluid communication with the annular distribution channel. The intermediate wall channel is arranged in the intermediate wall essentially in the radial direction with the purpose of feeding lubricants to the annular distribution channel. According to one example embodiment, the intermediate wall channel comprises one intermediate wall outlet opening in fluid communication with the annular distribution channel. To increase the flow distribution of lubricants to the annular distribution channel, the intermediate wall channel comprises several intermediate wall outlet openings. The intermediate wall channel can be arranged as one straight channel or an annularly extending channel or as a network of channels with a number of intermediate wall outlet openings. The intermediate wall outlet openings are arranged with an extension in the axial direction to connect to the intermediate wall channel.

The lubricant feed unit can be any suitable device or arrangement comprising a hub for a clutch and/or brake. According to one example embodiment, the lubricant feed unit is in the form of a clutch cylinder attached to the planet carrier.

According to one example embodiment, the planetary gearset comprises a stationary transmission housing at least partly encompassing the gear arrangement and wherein the intermediate wall is attached to the transmission housing. The stationary transmission housing comprises a base channel with a base channel outlet opening and a base channel inlet opening, wherein the base channel outlet opening is arranged to coincide with the intermediate wall inlet opening, and wherein the base channel inlet opening is connectable to a lubricant feed source. The base channel is arranged to distribute lubricants from the feed source to the intermediate wall channel. The feed source may be arranged to apply pressure to the lubricant such that the entire system of channels are set under pressure for delivery of the lubricant to the planet gear bearings.

According to one example, the feed source is connected to a control unit arranged to control the distribution of lubricants to the channel system, for example by regulating the pressure and/or flow rate of the lubricant in the channel system.

As mentioned above, the planet carrier is arranged to be selectively stationary or rotatable in order to allow for a full range of speeds ratios between an input shaft and an output shaft and according to the invention the planet gear bearings are lubricated also when the planet carrier is stationary.

Furthermore, according to one example embodiment the planetary gearset comprises axial washers and/or bearings, hereinafter called planet gear thrust bearings, arranged between the planet gear and the planet carrier and around the planet gear shaft to allow for relative motion of the planetary gears with relation to the planet carrier. The planetary gearset according to the invention described above further gives the advantage that the planet gear shaft channel with inlet opening and an outlet opening allows for feeding of the lubricant also to the planet gear thrust bearings.

It should be noted that the present invention relates also to any type of planetary gearset comprising planetary gears and corresponding planet gear shaft that allows for the planet gear shaft to extend through the planet carrier to form the protruding portion according to the above. The planetary gearset may for example be a single planetary gearset or a double planetary gearset comprising a pair of interlinked planetary gears.

The invention further relates to a vehicle comprising a planetary gearset according to the above.

The invention further relates to a stationary unit comprising a planetary gearset according to the above. Here, a stationary unit refers to a device not intended to be in motion.

BRIEF DESCRIPTION OF THE DRAWINGS

With reference to the appended drawings, below follows a more detailed description of embodiments of the invention cited as examples.

In the drawings:

FIG. 1 schematically shows vehicle comprising a planetary gearset according to the invention and FIGS. 2-5, FIG. 2 schematically shows a planetary gear arrangement according to an embodiment of the invention, FIG. 3 schematically shows a planetary gearset according to one example embodiment with a gear arrangement according to FIG. 2, FIG. 4 schematically shows a planetary gearset according to one example embodiment with a gear arrangement according to FIGS. 2 and 3, and wherein;

DETAILED DESCRIPTION OF EXAMPLE EMBODIMENTS OF THE INVENTION

In order to facilitate the description of the invention reference is made to a cylindrical coordinate system with an axial direction and a radial direction being perpendicular to the axial direction. When referring to rotation, the rotation is about an axis extending in the axial direction. When referring to circumferential, it relates to a direction coinciding with the rotational direction.

Figure 1:
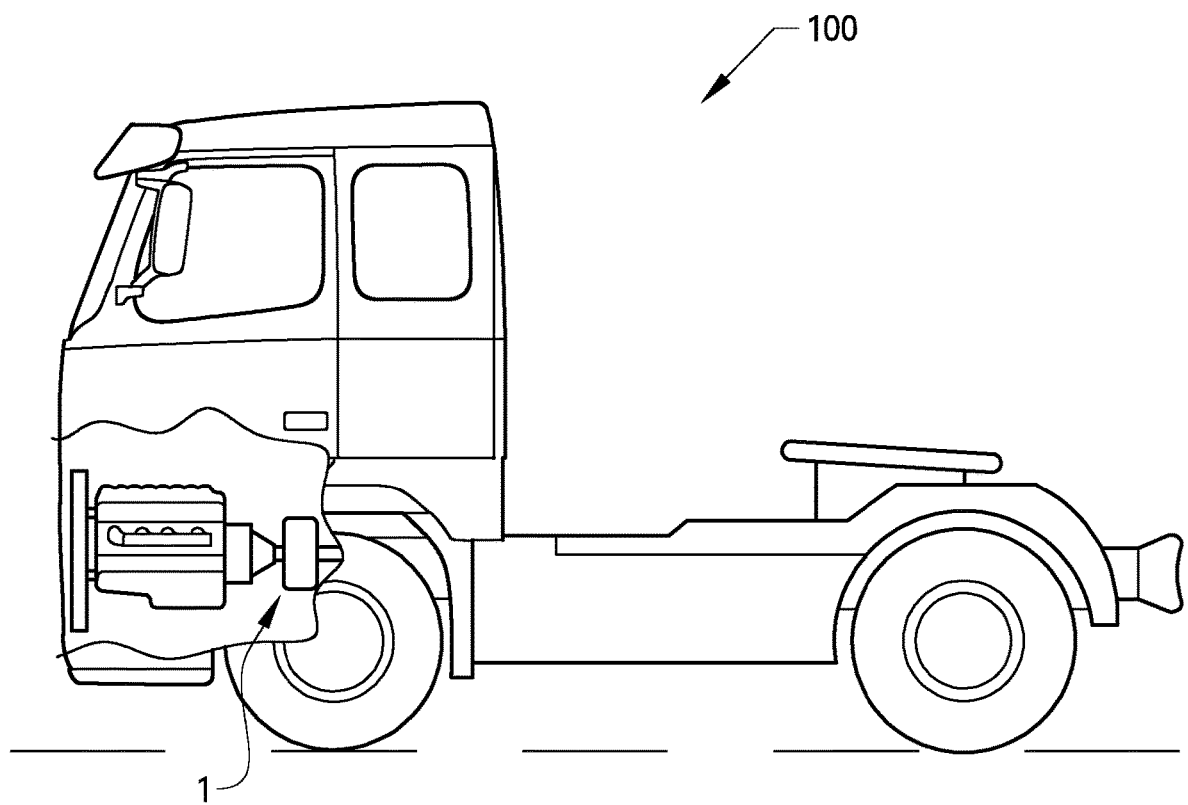

FIG. 1 schematically shows vehicle 100 comprising a planetary gearset 1 according to the invention and FIGS. 2-5.

Figure 2:
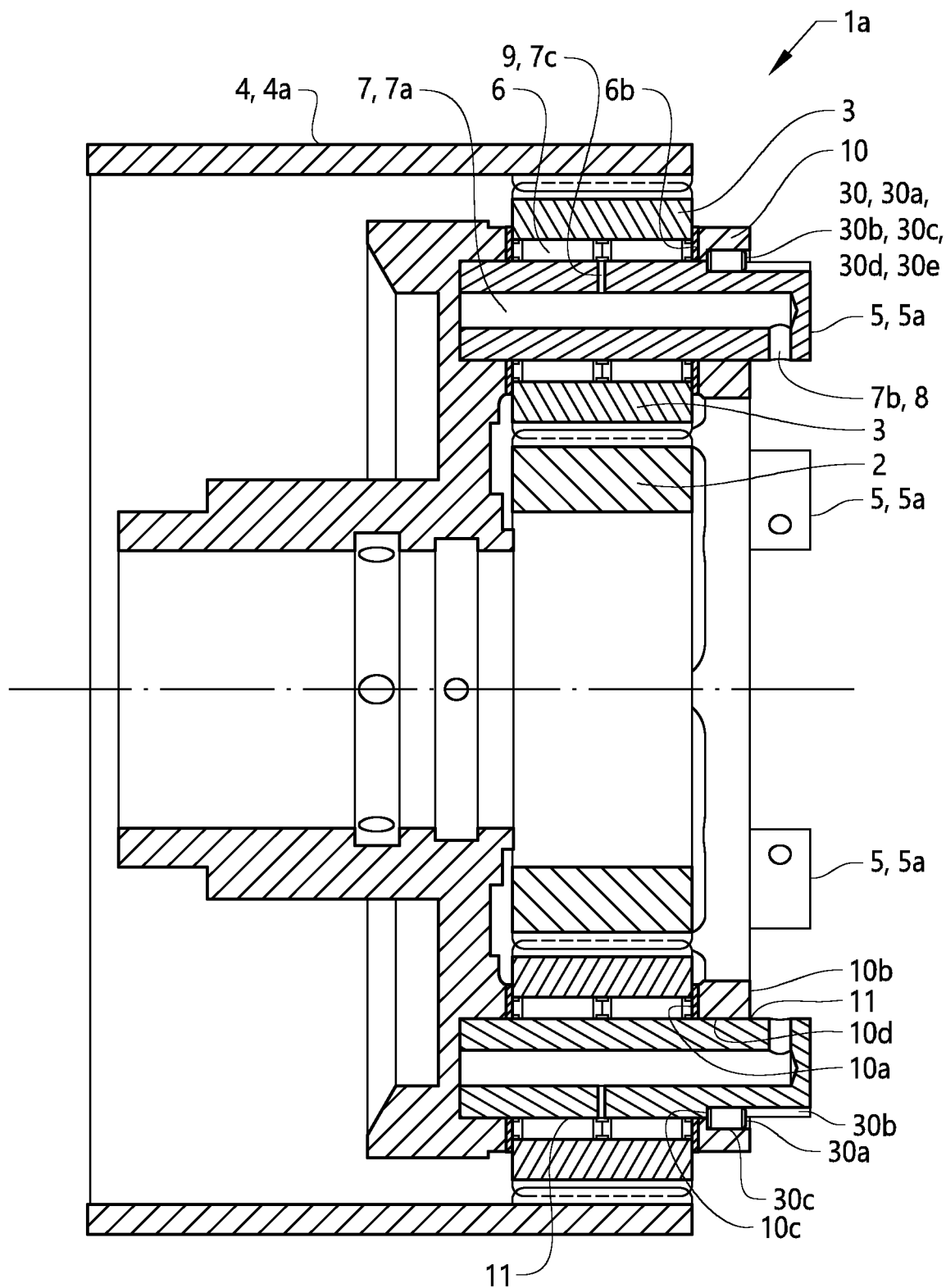

FIG. 2 schematically shows a planetary gearset 1 comprising a gear arrangement 1*a* comprising:
- a centrally arranged sun gear 2 arranged rotationally fixed to a drive shaft 101,
- a set of planet gears 3 distributed circumferentially around and meshing with the sun gear 2,
- a ring gear member 4 extending circumferentially around the planet gears 3 and being provided with a ring gear 4*a* meshing with the planet gears 3,
- a set of planet gear shafts 5, each arranged centrally in and connected to a corresponding planet gear 3 a set of planet gear bearings 6, each arranged between a corresponding planet gear shaft 5 and its corresponding planet gear 3 for rotatably connecting the planet gear 3 to the planet gear shaft 5, wherein each planet gear shaft 5 comprises a planet gear shaft channel 7 with an inlet opening 8 and an outlet opening 9 for feeding of a lubricant to the planet gear bearing 6, a planet carrier 10 connected to the set of planet gears 3 via the planet gear shafts 5, wherein each planet gear shaft 5 extends in an axial direction from the planet gear 3 through the planet carrier 10 and comprises a protruding portion 5a that protrudes out from the planet carrier 10 on an opposite side of the planet carrier 10 in relation to the planet gear 3, wherein the protruding portion 5a comprises the inlet opening 8 that allows for connection of a lubricant feed unit 12 being separate from the planet carrier 10.

The advantage of the gearset is that the planet carrier is free from channels, which makes it possible to manufacture a solid small/thin and lightweight planet carrier.

The planet carrier 10 comprises an inside surface 10a facing the planet gears 3 and an outside surface 10b facing away from the planet gears 3. The protruding portion 5a protrudes out from the outside surface 10b of the planet carrier 10.

FIG. 2 schematically shows that the planet gear shaft 5 is stored in the planet carrier 10 on either side of the planet gear 3. A first end of the planet gear shaft 5 is stored in the planet gear via the portion of the planet gear shaft 5 that extends through the planet carrier 10 and the second end can be stored in any suitable way. In FIG. 2, the second end is stored in an indentation in the planet carrier 5.

In FIG. 2 the planetary gearset 1 comprises a locking member 30 arranged in connection to the planetary gear shaft 5 and the planet carrier 10 for locking the planet gear shaft 5 in a predetermined position in relation to the planet carrier 10. In FIG. 2, the locking member 30 comprises a locking pin 30a and a first indentation 30b in the planet gear shaft envelope surface 11 and a second indentation 30c in the planet carrier 10. The first and second indentations 30b, 30c are juxtapositioned each other and the locking pin 30a is positioned partly in both the first and second indentation 30b, 30c thereby hindering relative motion of the planetary gear shaft 5 in relation to the planet carrier 10. One advantage of using pin and indentations 30b, 30c is that the indentations can be arranged in a direction coinciding with the direction of insertion of the planetary gear shaft 5 into the planet carrier 10 and the locking pin 30a can be inserted into one of the indentations and then slid into position of the other indentation.

FIG. 2 shows that the planet carrier 10 comprises a through channel 10c per planetary gear shaft 5 extending from the inside surface 10a to the outside surface 10b. Each through channel 10c is arranged to house the planetary gear shaft 5 and is delimited by an inner wall 10d. FIG. 2 shows that the second indentation 30c is arranged in the inner wall 10d and the second indentation 30c comprises an opening 30d in the inside surface 10a and an opening 30e in the outside surface 10b of the planet carrier 10 allowing for the locking pin 30a to enter the second indentation 30c via the openings. The second indentation 30c is furthermore arranged with an orientation coinciding with the travel direction of the planetary gear shaft 5 when inserted into the through channel 10c of the planet carrier 10.

FIG. 2 shows that the planet gear shaft channel 7 in the planet gear shaft 5 comprises an axially extending planet gear shaft main channel 7a and a planet gear shaft inlet channel 7b connecting the planet gear shaft main channel 7a to the inlet opening 8, wherein the inlet opening 8 is arranged radially in the planet gear shaft 5 envelope surface 11. The planet gear shaft inlet channel 7b can be arranged strictly in the radial direction as in FIG. 2, i.e. perpendicular to the axial direction, or may be arranged at an angle to the axial direction.

FIG. 2 furthermore shows that the planet gear shaft channel 7 in the planet gear shaft 5 comprises an planet gear shaft outlet channel 7c connecting the planet gear shaft main channel 7a to the outlet opening 9, wherein the outlet opening 9 is arranged radially in the planet gear shaft envelope surface 11 and in connection to the planet gear bearing 6. The planet gear shaft outlet channel 7c can be arranged strictly in the radial direction as in FIG. 1, i.e. perpendicular to the axial direction, or may be arranged at an angle to the axial direction.

In FIG. 2, the planet gear shaft main channel 7a is arranged concentric in the planet gear shaft 5. The advantage is that the planet gear shaft 5 becomes stronger than a planet gear shaft 5 with different wall thickness.

FIG. 2 further schematically shows that the planetary gearset 1 comprises axial washers and/or bearings, hereinafter called planet gear thrust bearings 6b, arranged between the planet gear 3 and the planet carrier 10 and around the planet gear shaft 5 to allow for relative motion of the planetary gears 3 with relation to the planet carrier 10. The planet gear shaft channel 7 with inlet opening 8 and an outlet opening 9 allows for feeding of the lubricant also to the planet gear thrust bearings 6b.

Figure 3:
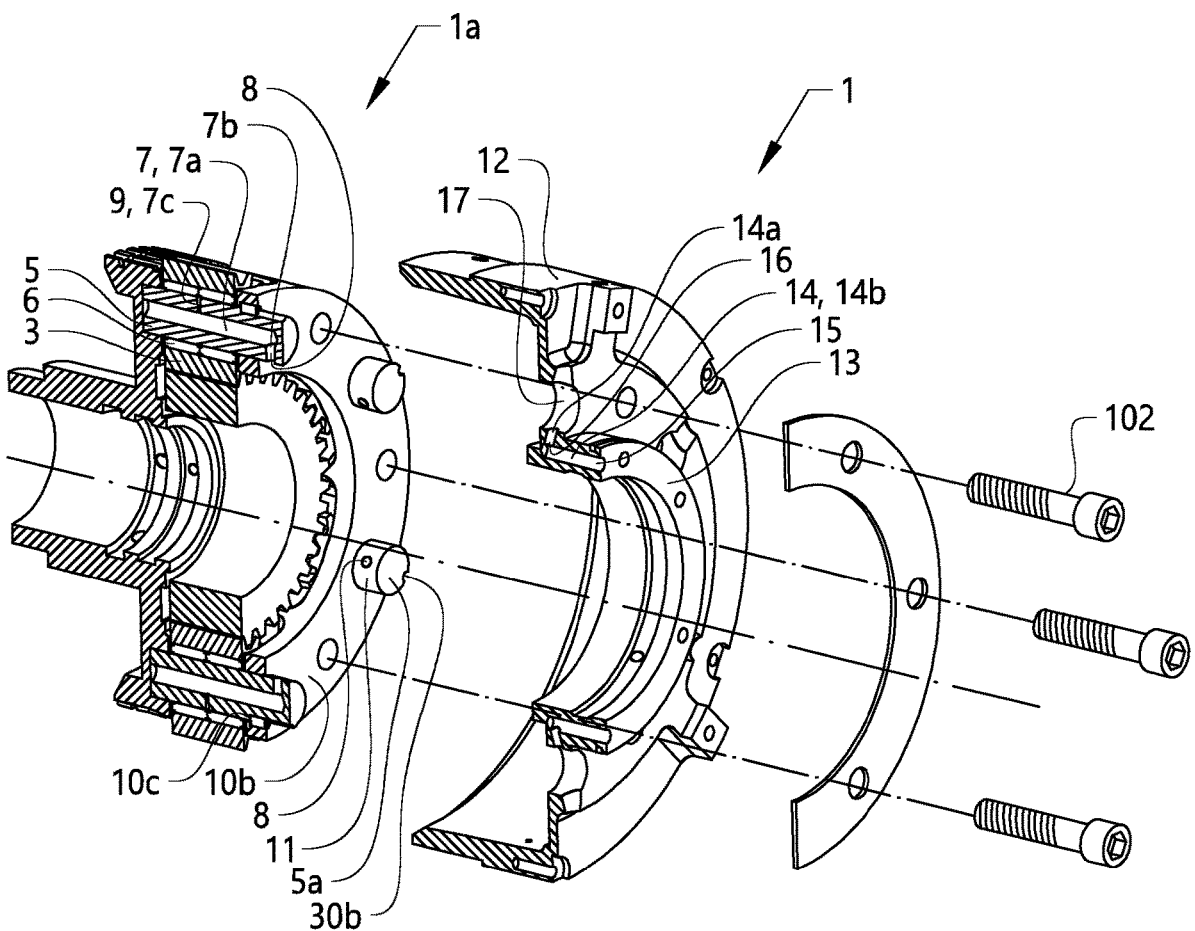

FIG. 3 schematically shows that the planetary gearset 1 comprises a lubricant feed unit in the form of a clutch cylinder 12 attached to the planet carrier 10 via bolts 102. The clutch cylinder 12 is fixedly attached to the planet carrier 10 and follows the motion of the planet carrier 10, i.e. rotates or is stationary. The clutch cylinder 12 comprises an annular extension 13 extending in the axial direction. Here axial direction coincides with axial direction of the planet gear shaft 5 when mounted into the through channel 10c of the planet carrier 10. The annular extension 13 comprises feed channels 14, each feed channel 14 comprising a feed channel inlet opening 15 and a feed channel outlet opening 16 arranged to coincide with the inlet opening 8 of the planet gear shaft channel 7 for fluid communication of a lubricant from the annular extension 13 to the planet gear shaft channel 7. Each feed channel 14 has a main extension in the axial direction and the feed channel outlet opening 16 faces in the radial direction towards the inlet opening 8 of the planet gear shaft channel 7. In FIG. 3 there is one feed channel 14 per planetary gear shaft 5.

Figure 4:
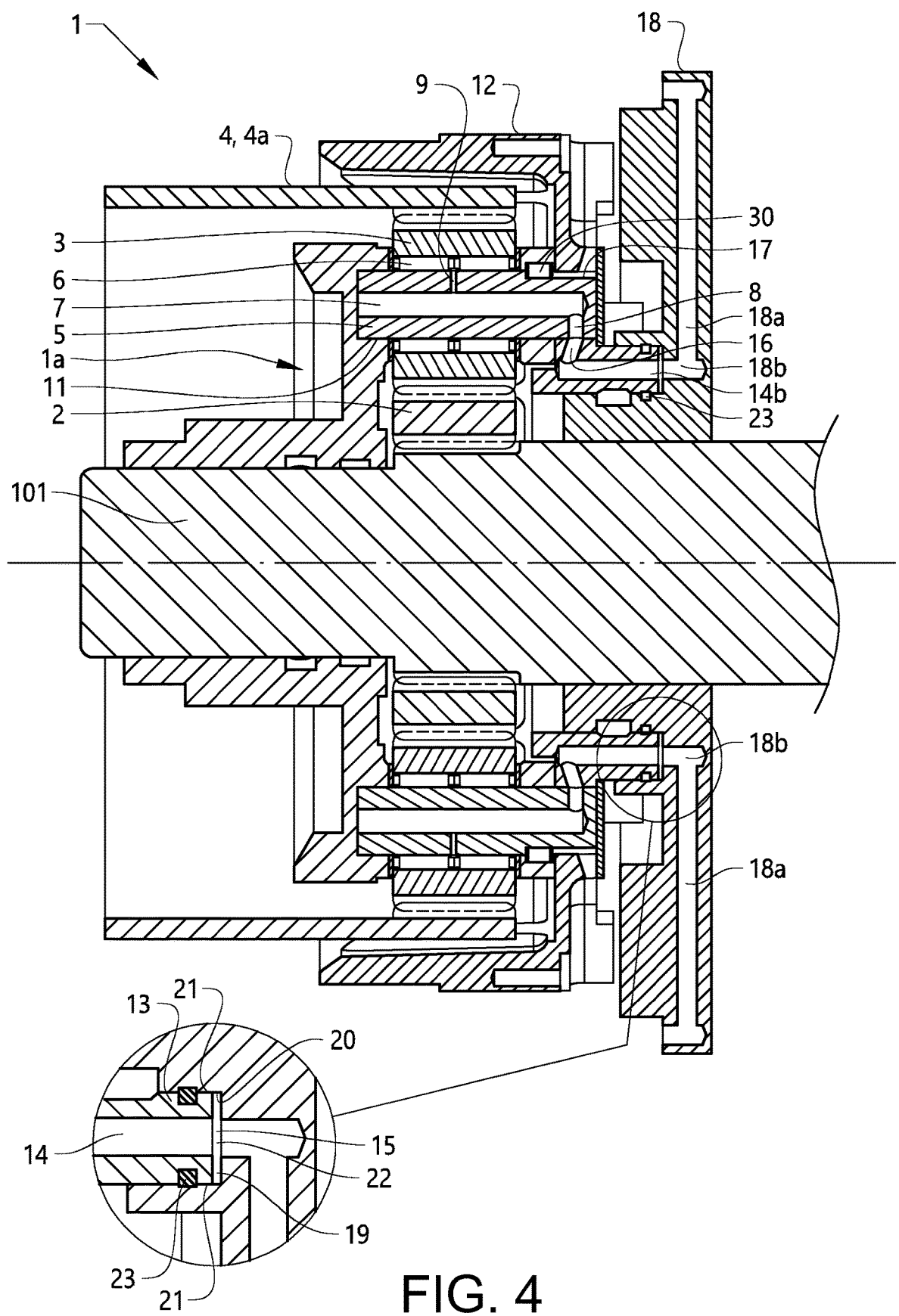
Figure 5:
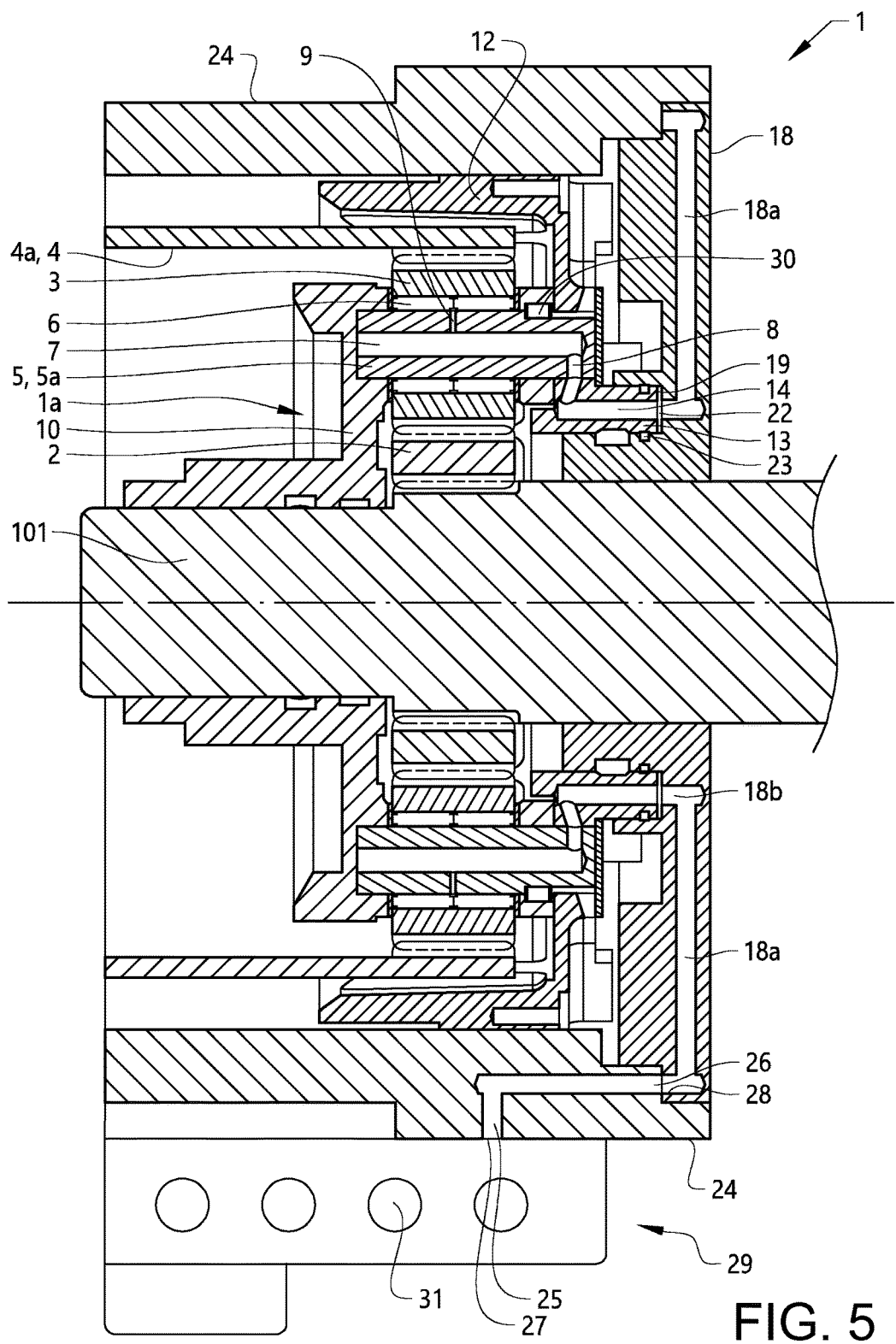
FIG. 5 schematically shows a planetary gearset according to one example embodiment with a gear arrangement according to FIGS. 2 to 4.

FIG. 3 shows that the annular extension 13 comprises a receiving portion 17 adapted to be attached to the protruding portion 5a of the planet gear shaft 5, wherein the receiving portion 17 comprises the feed channel outlet opening 16 coinciding with the inlet opening 8 of the planet gear shaft 5. The receiving portion 17 is formed to fit the size, form and length of the protruding portion 5a. The receiving portion could be arranged with a snug fit or with a play between the receiving portion and the protruding portion creating a channel that allows the lubricant to flow from the feed channel outlet opening to the inlet opening of the planet gear shaft. Sealing elements can be arranged between the planet gear shaft and the receiving portion to hinder the lubricant from leaking out towards the planet carrier. One advantage with this arrangement is that the feed channel outlet opening does not have to match, i.e. coincide, entirely with the inlet opening of the planet gear shaft to ensure fluid communication of the lubricant FIGS. 3-5 shows that the feed channel 14 comprises an angled portion 14a and a main feed channel 14b extending in the axial direction. The angled portion 14a is arranged between the feed channel outlet opening 16 and the main feed channel 14b. The angled portion has the advantage of easy manufacture since the feed channel outlet opening 16 can be drilled open together with the angled portion with use of a drill working at an angle in the receiving portion 17. Hence, the main feed channel 14b can be created by a first drill operation from the feed channel inlet opening 15 side and then be connected to the angled portion by a second drill operation creating the angled portion 14a and the feed channel outlet opening 16 from the feed channel outlet opening 16 side.

FIG. 4 schematically shows that the planetary gearset 1 comprises an intermediate wall 18 comprising an annular recess 19 having a bottom wall 20 and two therefrom axially extending sidewalls 21, wherein the sidewalls 21 form a bearing race way for the annular extension 13, and wherein the bottom wall 20 is arranged at a distance from the annular extension 13 forming an annular distribution channel 22 between the bottom wall 20 and the annular extension 13 for feeding the lubricant from the intermediate wall 18 to the feed channel inlet openings 15 in the annular extension 13.

FIG. 4 schematically shows that the planetary gearset 1 comprises an annular seal element 23 arranged between the respective sidewalls 21 and the annular extension 13, wherein the annular seal element 23 is arranged to seal between the sidewalls 21 and the annular extension 13. The annular seal element 23 is arranged to allow for movement of the clutch cylinder 12, and thus the annular extension 13, in relation to the intermediate wall such that the lubricant is sealed from leaking out from the annular recess 19 between the annular extension 13 and the axially extending sidewalls 21.

FIG. 4 schematically shows that the intermediate wall 18 comprises an intermediate wall channel 18a comprising an intermediate wall inlet opening 28 and an intermediate wall outlet opening 18b in fluid communication with the annular distribution channel 22. The intermediate wall channel 18a is arranged in the intermediate wall 18 essentially in the radial direction with the purpose of feeding lubricants to the annular distribution channel 22. FIG. 4 shows that the intermediate wall channel 18a comprises one intermediate wall outlet opening 18b in fluid communication with the annular distribution channel 22. To increase the flow distribution of lubricants to the annular distribution channel 22, the intermediate wall channel 18a comprises several intermediate wall outlet opening 18b.

The intermediate wall channel 18a can be arranged as one straight channel or an annularly extending channel as in FIG. 4 or as a network of channels with a number of intermediate wall outlet opening 18b. The intermediate wall outlet openings 18b are arranged with an extension in the axial direction to connect to the intermediate wall channel 18a.

FIG. 5 shows that the planetary gearset 1 comprises a stationary transmission housing at least partly encompassing the gear arrangement 1a and wherein the intermediate wall 18 is attached to the transmission housing 25. The stationary transmission housing 24 comprises a base channel 25 with a base channel outlet opening 26 and a base channel inlet opening 27, wherein the base channel outlet opening 26 is arranged to coincide with the intermediate wall inlet opening 28, and wherein the base channel inlet opening 27 is connectable to a lubricant feed source 29. The base channel 25 is arranged to distribute lubricants from the feed source to the intermediate wall channel 18a. The feed source 28 may be arranged to apply pressure to the lubricating medium such that the entire system of channels are set under pressure for delivery of the lubricant to the planet gear bearings.

FIG. 5 shows that the lubricant feed source 29 is connected to a control unit 31 arranged to control the distribution of lubricants to the channel system, for example by regulating the pressure of the lubricant in the channel system. Here channel system refers to the channels described in connection to FIGS. 2-5.

As mentioned above, the planet carrier 10 is arranged to be selectively stationary or rotatable in order to allow for a full range of speeds ratios between an input shaft and an output shaft and according to the invention the planet gear bearings are lubricated also when the planet carrier is stationary.

It is to be understood that the present invention is not limited to the embodiments described above and illustrated in the drawings; rather, the skilled person will recognize that many changes and modifications may be made within the scope of the appended claims. For example, the planet gear shaft comprises a plurality of planet gear shaft inlet channels and corresponding inlet openings and/or a plurality of planet gear shaft outlet channels and corresponding outlet openings. One advantage is the possibility to increase the flow of lubricant. One advantage with a plurality of planet gear shaft outlet channels and corresponding outlet openings is an increased spread of lubricant towards the planet gear bearings. Furthermore, a plurality of feed channels is possible to increase fluid flow.

The invention claimed is:

1. A planetary gearset comprising a gear arrangement comprising:
    a centrally arranged sun gear arranged to be rotationally fixed to a drive shaft,
    a set of planet gears distributed circumferentially around and meshing with the sun gear,
    a ring gear member extending circumferentially around the planet gears and being provided with a ring gear meshing with the planet gears,
    a set of planet gear shafts, each arranged centrally in and connected to a corresponding planet gear
    a set of planet gear bearings, each arranged between a corresponding planet gear shaft and its corresponding planet gear for rotatably connecting the planet gear to the planet gear shaft,
    wherein each planet gear shaft comprises a planet gear shaft channel with an inlet opening and an outlet opening for feeding of a lubricant to the planet gear bearing,
    a planet carrier connected to the set of planet gears via the planet gear shafts,
    wherein
    each planet gear shaft extends in an axial direction from the planet gear through the planet carrier and comprises a protruding portion that protrudes out from the planet carrier on an opposite side of the planet carrier in relation to the planet gear, wherein the protruding portion comprises the inlet opening,
    wherein the planet gear shaft channel comprises an axially extending planet gear shaft main channel and a planet gear shaft inlet channel connecting the planet gear shaft main channel to the inlet opening, wherein the inlet opening is arranged facing in a radial direction in a planet gear shaft envelope surface.

2. A planetary gearset according to claim 1, wherein the planetary gearset comprises a locking member arranged in connection to a planet gear shaft of the set of planet gear shafts and the planet carrier for locking the planet gear shaft in a predetermined position in relation to the planet carrier.

3. A planetary gearset according to claim 2, wherein the planetary gearset comprises a lubricant feed unit attached to the planet carrier, wherein the lubricant feed unit comprises an annular extension extending in the axial direction, wherein the annular extension comprises feed channels, each feed channel comprising a feed channel inlet opening and a feed channel outlet opening arranged to coincide with the planet gear shaft channel inlet opening for fluid communication of a lubricant from the annular extension to the planet gear shaft channel.

4. A planetary gearset according to claim 3, wherein the annular extension comprises a receiving portion adapted to be attached to the protruding portion of the planet gear shaft, wherein the receiving portion comprises the feed channel outlet opening coinciding with the inlet opening of the planet gear shaft.

5. A planetary gearset according to claim 4, wherein the lubricant feed unit is in the form of a clutch cylinder attached to the planet carrier.

6. A planetary gearset according to claim 3, wherein the planetary gearset comprises an intermediate wall comprising an annular recess having a bottom wall and two therefrom axially extending sidewalls, wherein the sidewalls form a bearing race way for the annular extension, wherein the bottom wall is arranged at a distance from the annular extension forming an annular distribution channel between the bottom wall and the annular extension for feeding the lubricant from the intermediate wall to the feed channel inlet openings in the annular extension.

7. A planetary gearset according to claim 6, wherein the planetary gearset comprises an annular seal element arranged between the respective sidewalls and the annular extension, wherein the annular seal element is arranged to seal between the sidewalls and the annular extension.

8. A planetary gearset according to claim 6, wherein the intermediate wall comprises an intermediate wall channel comprising an intermediate wall inlet opening and an intermediate wall outlet opening in fluid communication with the annular distribution channel.

9. A planetary gearset according to claim 6, wherein the planetary gearset comprises a stationary transmission housing at least partly encompassing the gear arrangement and wherein the intermediate wall is attached to the transmission housing.

10. A planetary gearset according to claim 9, wherein the stationary transmission housing comprises a base channel with a base channel outlet opening and a base channel inlet opening, wherein the base channel outlet opening is arranged to coincide with an intermediate wall inlet opening of the intermediate wall, and wherein the base channel inlet opening is connectable to a lubricant feed source.

11. A planetary gearset according to claim 3, wherein each feed channel comprises an angled portion.

12. A planetary gearset according to claim 1, wherein the planet gear shaft channel comprises a planet gear shaft outlet channel connecting the planet gear shaft main channel to the outlet opening, wherein the outlet opening is arranged facing in the radial direction in the planet gear shaft envelope surface and in connection to the planet gear bearing.

13. A planetary gearset according to claim 1, wherein the planet gear shaft main channel is arranged concentrically in the planet gear shaft.

14. A planetary gearset according to claim 1, wherein the planet carrier is arranged to be selectively stationary or rotatable.

15. A vehicle or stationary unit comprising a planetary gearset according to claim 1.

* * * * *